(12) United States Patent
Odate

(10) Patent No.: US 8,818,640 B2
(45) Date of Patent: Aug. 26, 2014

(54) SEATBELT DEVICE OF VEHICLE

(75) Inventor: Shotaro Odate, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 954 days.

(21) Appl. No.: 12/841,631

(22) Filed: Jul. 22, 2010

(65) Prior Publication Data

US 2011/0017857 A1 Jan. 27, 2011

(30) Foreign Application Priority Data

Jul. 22, 2009 (JP) ................................ 2009-171453

(51) Int. Cl.
*B60R 22/44* (2006.01)
*B60R 22/46* (2006.01)

(52) U.S. Cl.
CPC ......... *B60R 22/46* (2013.01); *B60R 2022/4666* (2013.01); *B60R 2022/468* (2013.01); *B60R 2022/4685* (2013.01)
USPC ............ 701/45; 701/29.1; 242/371; 242/374; 242/382.2; 280/801.1; 280/807

(58) Field of Classification Search
USPC ............ 701/29.1, 45; 241/371, 374; 242/371, 242/374
See application file for complete search history.

(56) References Cited

U.S. PATENT DOCUMENTS

| | | | |
|---|---|---|---|
| 2003/0094326 A1 | 5/2003 | Specht | |
| 2003/0209900 A1* | 11/2003 | Tobata | 280/807 |
| 2005/0083000 A1* | 4/2005 | Specht et al. | 318/432 |
| 2005/0098997 A1* | 5/2005 | Tanaka et al. | 280/807 |
| 2006/0064218 A1 | 3/2006 | Subbian et al. | |
| 2008/0017744 A1* | 1/2008 | Odate | 242/382.2 |
| 2008/0203783 A1 | 8/2008 | Fehring et al. | |
| 2009/0020997 A1* | 1/2009 | Odate | 280/801.1 |

FOREIGN PATENT DOCUMENTS

| | | |
|---|---|---|
| JP | 2001-334912 | 12/2001 |
| JP | 2005-138757 | 6/2005 |
| JP | 2006-298187 | 11/2006 |
| JP | 2009-500236 | 1/2009 |
| WO | 2007/008467 | 1/2007 |

* cited by examiner

*Primary Examiner* — Helal A Algahaim
*Assistant Examiner* — Michael Fouche
(74) *Attorney, Agent, or Firm* — Rankin, Hill & Clark LLP

(57) ABSTRACT

A seatbelt device of a vehicle includes: a webbing reel around which a webbing is rolled up; a motor; an acceleration detection unit detecting an acceleration applying to the vehicle; an electric current control unit controlling a driving current of the motor; and an acceleration condition determination unit determining whether or not an acceleration greater than or equal to a set value has been applied to the vehicle within a predetermined amount of time after an acceleration greater than or equal to a first threshold acceleration value has been applied to the vehicle. When the acceleration condition determination unit determines that an acceleration greater than or equal to the set value has been applied to the vehicle within the predetermined amount of time, the electric current control unit controls the driving current of the motor so that a set amount of the webbing is wrapped up.

4 Claims, 7 Drawing Sheets

SEATBELT DEVICE OF VEHICLE

The present application claims priority on Japanese Patent Application No. 2009-171453, filed Jul. 22, 2009, the content of which is incorporated herein by reference.

BACKGROUND OF THE INVENTION

1. Field of the Invention

The present invention relates to a seatbelt device of a vehicle. The seatbelt device ties down a passenger sitting on a seat of a vehicle by using a webbing.

2. Description of the Related Art

In recent years, a seatbelt device has been developed such that a motor pulls in a webbing based on need, and a passenger is tied down appropriately according to a condition of the vehicle (see, for example, Published Japanese Translation No. 2009-500236 of the PCT International Publication).

Incidentally, when a vehicle turns a corner or a sharp curve at a high speed, the upper body of a passenger seated on a seat may be jolted left and right as well as back and forth due to the acceleration. Currently, it is suggested that the swinging of the upper body of the passenger under such conditions be mitigated by using a seatbelt device.

In this case, the acceleration acting on the vehicle may be detected by a sensor, and a webbing may be wrapped up according to the detected acceleration. However, for example, when a predetermined amount of the webbing is wrapped up by the motor when the acceleration acting on the vehicle has exceeded a threshold, and the threshold is set to a small value, the webbing may tie down the passenger frequently. As a result, the comfort level of the passenger may be undermined. On the other hand, when the threshold is set to a large value, the webbing might not tie down the passenger when, for instance, the vehicle is in a turning motion.

Considering the problems described above, an object of the present invention is to provide a seatbelt device of a vehicle which appropriately determines the situation in which the passenger is required to be tied down, and enhances the efficiency with which the passenger is tied down, without impairing the comfort level experienced by the passenger.

SUMMARY OF THE INVENTION

In order to achieve the above object, the present invention employs the following.

(1) Namely, a seatbelt device of a vehicle (hereinafter may be referred to as a "seatbelt device") according to an aspect of the present invention includes: a webbing reel around which a webbing is rolled up; a motor which is driven to rotate the webbing reel; an acceleration detection unit detecting an acceleration applying to the vehicle; an electric current control unit controlling a driving current of the motor; and an acceleration condition determination unit determining, based on a detection signal of the acceleration detection unit, whether or not an acceleration greater than or equal to a set value has been applied to the vehicle within a predetermined amount of time after an acceleration greater than or equal to a first threshold acceleration value has been applied to the vehicle. When the acceleration condition determination unit determines that an acceleration greater than or equal to the set value has been applied to the vehicle within the predetermined amount of time, the electric current control unit controls the driving current of the motor so that a set amount of the webbing is wrapped up.

Based on the above described configuration, when an acceleration exceeding a first threshold acceleration is applied to a running vehicle, an acceleration condition determination unit determines whether or not an acceleration greater than or equal to a predetermined value has been applied during a predetermined amount of time thereafter. When the acceleration condition determination unit determines that an acceleration greater than or equal to the predetermined value has been applied to the vehicle during the predetermined amount of time, a motor wraps up a predetermined amount of webbing under the control of the drive electric current by the electric current controlling unit. As a result, the webbing comes in close contact with the passenger seated on the seat. Thus, the webbing quickly ties down the passenger.

(2) In addition, the above seatbelt device may be configured as follows: after the electric current control unit controls the driving current of the motor so that the set amount of the webbing is wrapped up when the acceleration condition determination unit determines that an acceleration greater than or equal to the set value has been applied to the vehicle within the predetermined amount of time, the electric current control unit controls the driving current of the motor according to a movement of an upper body of a passenger.

Based on the above configuration, when the motor has wrapped up a predetermined amount of the webbing, and the webbing is about to be pulled out by the jolting of the upper body of the passenger, the motor is driven so as to retract the pulled portion of the webbing. Therefore, as long as the webbing is not pulled out by the jolting of the upper body of the passenger, there will not be any unnecessary amount of binding force applied to the passenger due to the webbing.

(3) In addition, the above seatbelt device may be configured as follows: when the acceleration condition determination unit determines that an acceleration greater than or equal to the set value has not been applied to the vehicle within the predetermined amount of time, the electric current control unit controls the driving current of the motor according to a movement of an upper body of a passenger.

Based on the above configuration, when the acceleration condition determination unit determines that an acceleration greater than or equal to the predetermined value has not been applied to the vehicle during the predetermined amount of time, the wrapping up operation of the predetermined amount of webbing, which removes the slackness of the webbing, is not performed. Instead, the driving electric current of the motor is controlled according to the movement of the upper body of the passenger.

(4) In addition, the above seatbelt device may further include a clutch maintaining the motor and the webbing reel in a connected state in response to a rotational torque greater than or equal to a set torque value in a direction in which the webbing is wrapped up by the motor. The above seatbelt device may be configured as follows: when an acceleration being applied to the vehicle is greater than or equal to a second threshold acceleration value, the second threshold acceleration value being smaller than the first threshold acceleration value, and is less than the first threshold acceleration value, the electric current control unit controls the driving current of the motor so that the clutch is maintained in the connected state, without the motor being driven to wrap up the webbing reel.

(5) In addition, the above seatbelt device may further include a timer measuring a time; and a control device initiating a measurement of the time with the timer when, after the acceleration detected by the acceleration detection unit becomes greater than or equal to a second threshold acceleration value, the acceleration becomes greater than or equal to the first threshold acceleration value. Here, the second threshold acceleration value is smaller than the first threshold acceleration value. Furthermore, the electric current control unit controls the driving current of the motor so that the webbing is wrapped up by a predetermined length, when the acceleration condition determination unit determines that the acceleration detected by the acceleration detection unit is greater than or equal to the second threshold acceleration value, while the time measured with the timer is within a predetermined period of time.

Based on the above configuration, when an acceleration applied to the vehicle is greater than or equal to a second threshold acceleration and is less than a first threshold acceleration, and, for example, the upper body of the passenger is not presently jolting despite the possibility that the situation might change such that the upper body of the passenger will start jolting, the clutch is maintained in a connected state due to the control of the driving electric current of the motor. In this way, the motor does not wrap up the webbing. Instead, the motor functions as a load which resists the pulling out operation of the webbing.

Based on the seatbelt device according to the aspect of the present invention described above in (1), when an acceleration greater than or equal to a first acceleration threshold, in which there is a high possibility that the upper body of the passenger will be jolted, is detected, it is determined whether or not an acceleration greater than or equal to a predetermined value has been applied to the vehicle within a predetermined amount of time thereafter. When it is determined that an acceleration greater than or equal to a predetermined value has been applied, the driving electric current of the motor is controlled so that a predetermined amount of the webbing is wrapped up. Thus, in a situation in which the upper body of the passenger is somewhat continuously vibrated, the passenger can be tied up with the webbing promptly and reliably. Therefore, according to the aspect of the present invention, the passenger can be kept in place with high reliability without undermining the comfort level of the passenger due to the passenger being restrained in any unnecessary manner.

Based on the seatbelt device according to the aspect of the present invention described above in (2), when the acceleration condition determination unit determines that an acceleration greater than or equal to a predetermined value has been applied to the vehicle within a predetermined amount of time, a predetermined amount of webbing is wrapped up. Thereinafter, the driving electric current of the motor is controlled according to the movement of the upper body of the passenger. As a result, as long as the webbing is not pulled out by the swinging movement of the upper body of the passenger, there will not be any unnecessary binding force that is applied to the passenger. Thus, it is possible to retain the comfort level of the passenger in addition to keeping the passenger in place with a high degree of reliability.

Based on the seatbelt device according to the aspect of the present invention described above in (3), when the acceleration condition determination unit determines that the vehicle has not been applied with an acceleration greater than or equal to a predetermined value within a predetermined amount of time, the wrapping up of the predetermined amount of webbing, which removes the slackness of the webbing, is not performed. Instead, the driving electric current of the motor is controlled according to the movement of the upper body of the passenger. Therefore, it is possible to prevent any unnecessary restraining of the passenger by the webbing while the upper body of the passenger does not vacillate. At the same time, when the upper body of the passenger is vibrated, the webbing keeps the passenger in place with reliability.

Based on the seatbelt device according to the aspect of the present invention described above in (4), when the acceleration applied to the vehicle is greater than or equal to a second acceleration threshold, and is less than a first acceleration threshold, the motor only serves as a load resisting the pulling out of the webbing. As a result, the pressure applied to the passenger by the webbing is reduced, while preparing for the control operation of the wrapping up of the webbing.

DETAILED DESCRIPTION OF THE PREFERRED EMBODIMENTS

Hereunder, an embodiment of a seatbelt device according to the present invention is described with reference to FIGS. 1 to 8.

Figure 1:
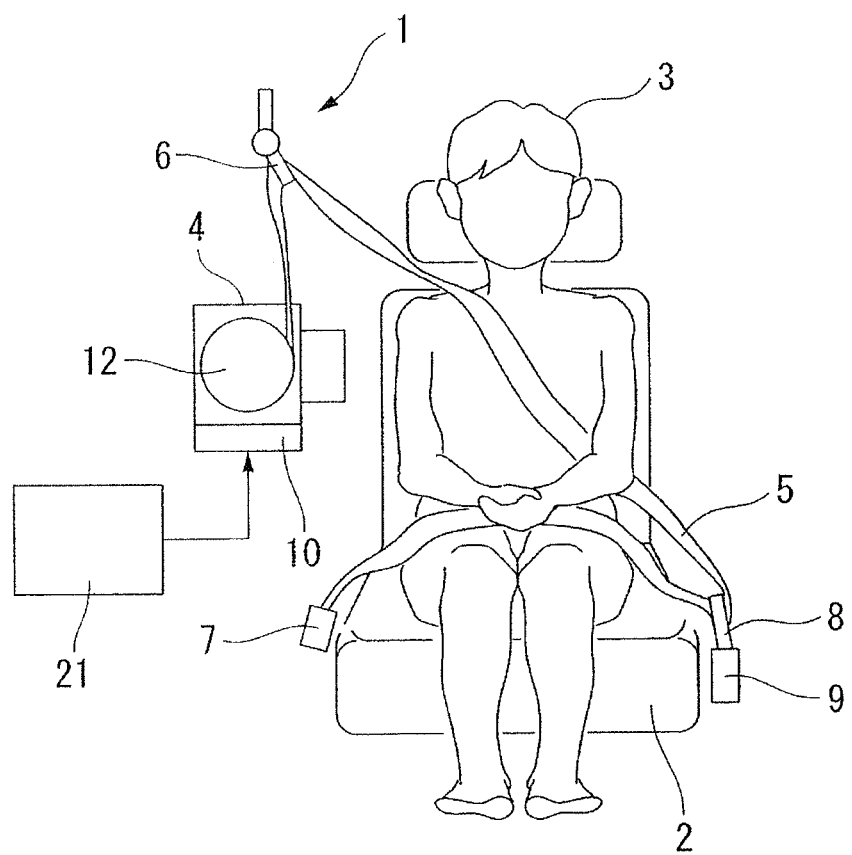
FIG. 1 is a general configuration diagram of a seatbelt device according to an embodiment of the present invention.

FIG. 1 is a skeletal framework showing an overall configuration of a seatbelt device 1 according to the above embodiment of the present invention. FIG. 1 shows a seat 2 on which a passenger 3 is seated. The seatbelt device 1 according to the above embodiment of the present invention is a seatbelt device generally known as a three-point type seatbelt. A webbing 5 is pulled upwards from a retractor 4 installed on a center pillar (not diagrammed). The webbing 5 is passed through a through anchor 6 supported by an upper portion of the center pillar. A tip of the webbing 5 is fixed to a floor of a vehicle body via an outer anchor 7 located on the seat 2 positioned towards the outer side of the vehicle's interior. A tongue plate 8 is passed between the through anchor 6 of the webbing 5 and the outer anchor 7. The tongue plate 8 can be attached to or be detached from a buckle 9 fixed to the floor of the vehicle body of the seat 2 towards the inner side of the vehicle's interior.

The webbing 5 is initially wrapped up by the retractor 4. When the passenger 3 pulls out the webbing 5 with his or her hand and attaches the tongue plate 8 to the buckle 9, the webbing 5 ties down primarily the passenger 3's chest and abdomen against the seat 2. An electrically-operated motor 10 automatically pulls in the webbing 5 when the movement of the vehicle changes drastically and when an emergency occurs.

Figure 2:
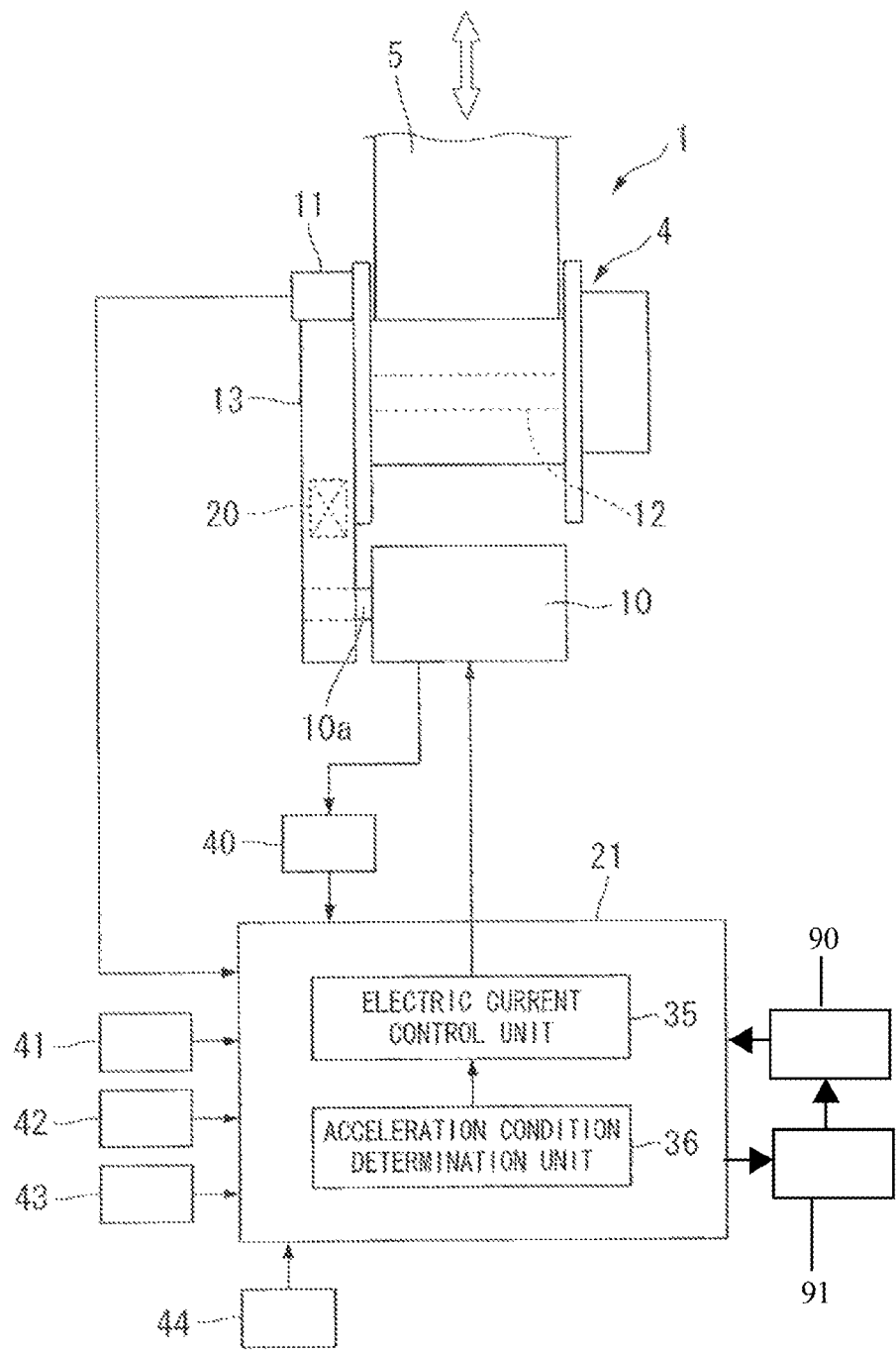
FIG. 2 is a general configuration diagram of a retractor and a controller of a seatbelt device according to an embodiment of the present invention.

The retractor 4 is structured so that, as shown in FIG. 2, the webbing 5 is wrapped around the belt reel 12 which is supported by a casing (not diagramed) so that the belt reel 12 can rotate. Further, an axis of the belt reel 12 protrudes from one side of an edge of the casing. The belt reel 12 is connected to a rotational axis 10a of the motor 10 via a power transmission mechanism 13 so that the belt reel 12 can interlock with the rotational axis 10a. The power transmission mechanism 13 decelerates the rotation of the motor 10 and transmits power to the belt reel 12. A wind-up spring (not diagramed) is placed on the retractor 4. The wind-up spring biases the belt reel 12 in the direction in which the webbing is rolled up. The tension produced by the wind-up spring operates on the webbing 5 while the belt reel 12 and the motor 10 are separated by a clutch 20 described below.

A rotational sensor 11 (rotation-condition detection unit) is placed on the retractor 4. The rotational sensor 11 detects the rotation of the belt reel 12. The rotational sensor 11 includes, for example, a magnetic circular plate, a pair of hall elements, and a sensor circuit. The magnetic circular plate is structured so that opposite magnetic poles are magnetized in a direction along the circumference. The magnetic circular plate rotates along with the belt reel 12. The pair of hall elements is placed adjacent to the outer rim of the magnetic circular plate. The sensor circuit processes the detection signal of the hall elements. The pulse signal processed by the sensor circuit is outputted to the controller 21.

In this case, the pulse signal is inputted from the sensor circuit to the controller 21 according to the rotation of the belt reel 12. This pulse signal is used to detect, for instance, the number of rotations made by the belt reel 12, the rotational velocity of the belt reel 12, and the direction in which the belt reel 12 is rotating. In other words, the controller 21 detects the number of rotations made by the belt reel 12 (corresponding to how much the webbing 5 is pulled out) by counting the pulse signals. In addition, the controller 21 determines the rotational velocity of the belt reel 12 (corresponding to the velocity at which the webbing 5 is rolled up and pulled out) by computing the change in the velocity (the frequency) of the pulse signal. Furthermore, the controller 21 detects the direction in which the belt reel 12 is rotating by comparing the rearing of the wave forms of two pulse signals.

Figure 3:
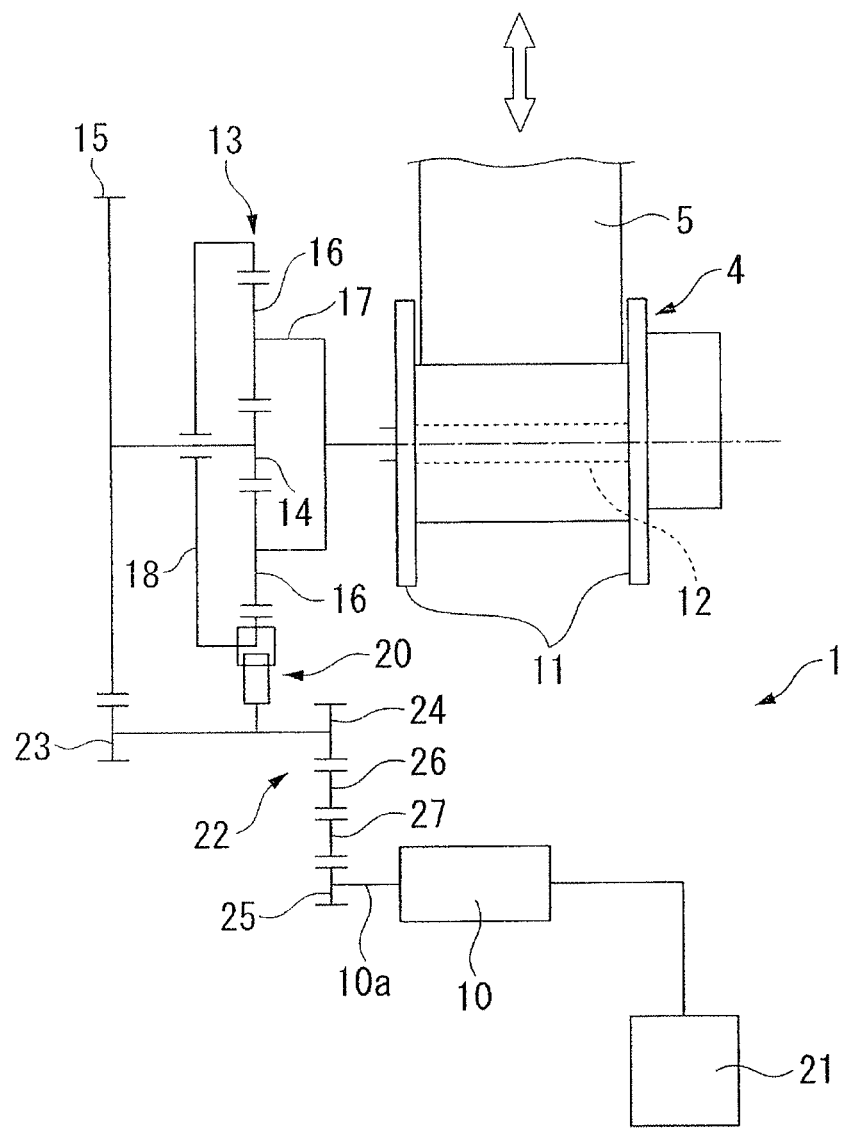
FIG. 3 is a general configuration diagram of a retractor of a seatbelt device according to an embodiment of the present invention.
Figure 4:
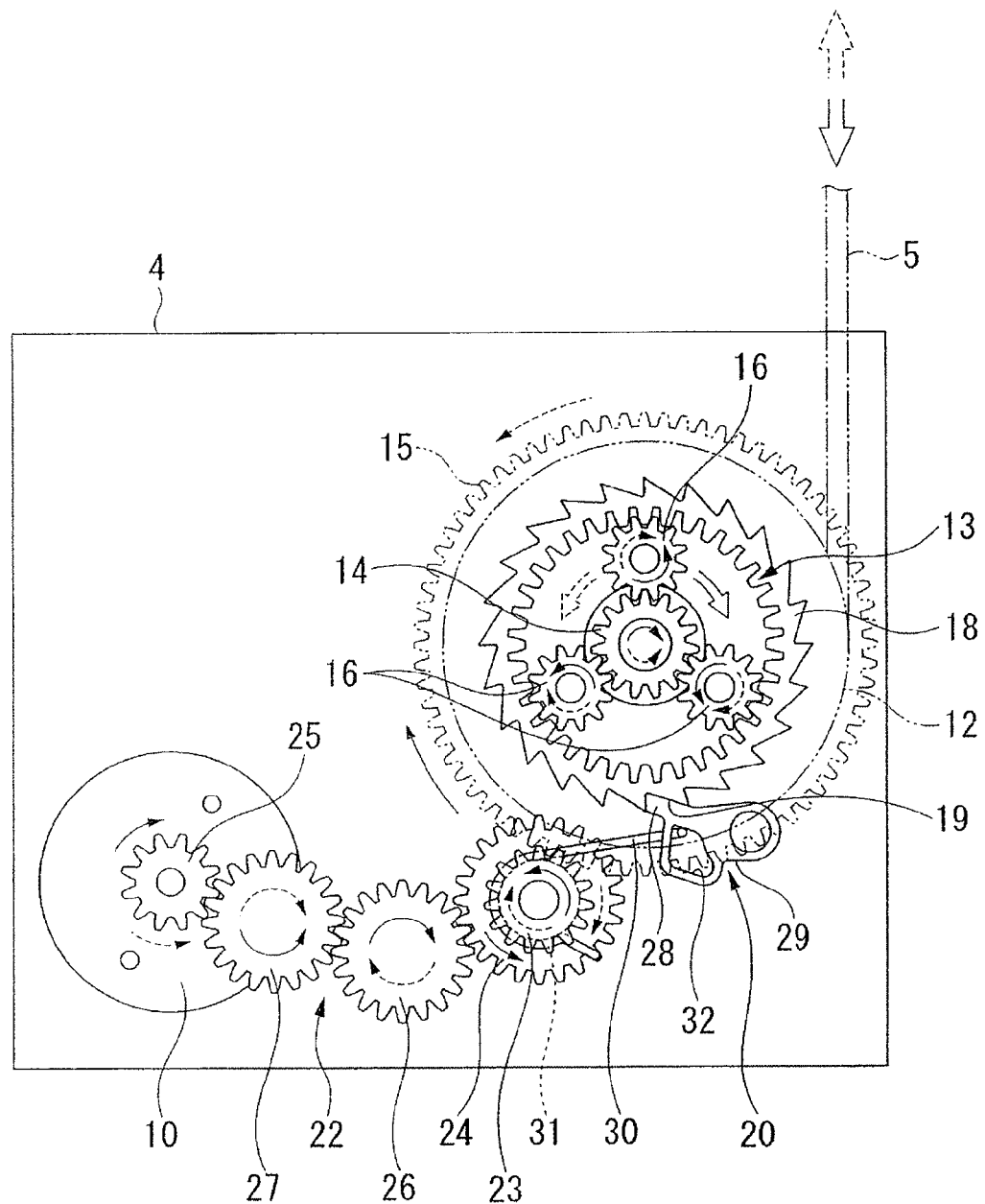
FIG. 4 is a general configuration diagram of a frontal view of a power transmission system of a retractor of a seatbelt device according to an embodiment of the present invention.
Figure 5:
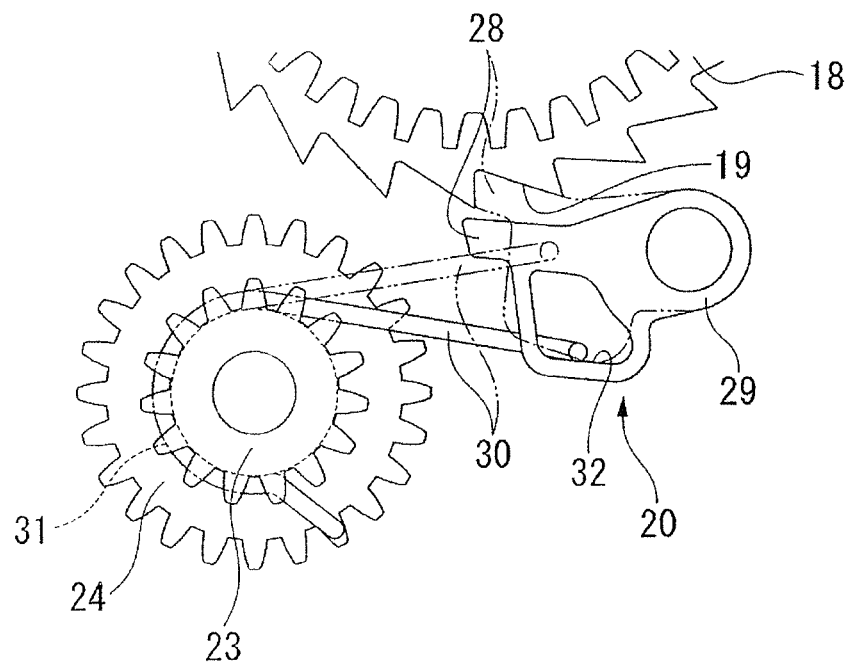
FIG. 5 is a diagram showing an expanded view of a portion of FIG. 4 indicating a seatbelt device according to an embodiment of the present invention.

FIGS. 3-5 show a detailed configuration of a power transmission mechanism 13. The power transmission 13 is structured so that a sun gear 14 is integrated with an external gear 15 used to input the drive. At the same time, a carrier 17 supporting multiple planetary gears 16 is connected to the axis of the belt reel 12. Thus, multiple ratchet teeth 19 (refer to FIG. 4) are formed along the outer circumference of a ring gear 18. The ring gear 18 engages with a planetary gear 16. This ratchet tooth 19 is included as one part of the clutch 20. The clutch 20 connects and disconnects the power transmission mechanism between the motor 10 and the belt reel 12 based on a controlling operation by a motor control device 21.

A motor-side power transmission system 22 of the power transmission mechanism 13 includes a first connect gear 23 with a small radius, which constantly engages with the external gear 15 integrated with the sun gear 14; a second connect gear 24 with a large radius, which is set up to rotate with the first connect gear 23 as an integrated whole on a same axis; and a first idle gear 26 and a second idle gear 27, both of which are located between the second connect gear 24 and a motor gear 25 (integrated with the rotational axis 10a of the motor 10) and are constantly engaged with each other so that power can be transmitted. The driving force of the motor 10 in the direction of normal rotation is transmitted to the second connect gear 24 and the first connect gear 23 through gears 25, 27, and 26 respectively, as shown by a solid arrow in FIG. 4. Further, the driving force is transmitted to the sun gear 14 via the external gear 15. Then, the driving force is transmitted to the belt reel 12 via the planetary gear 16 and the carrier 17. The driving force of the motor 10 in the direction of normal rotation causes the rotation of the belt reel 12 in the direction in which the webbing 5 is pulled in. The driving force, transmitted from the sun gear 14 to the planetary gear 16, is transmitted entirely to the side of the carrier 17, as described above, when the ring gear 18 is fixed. Meanwhile, when the ring gear 18 can rotate freely, the ring gear 18 idles away due to the planetary gear 16 rotating on its own axis. The clutch 20 turns on or off a transmission of the motor's driving force to the belt reel 12 (carrier 17) by controlling the locking and unlocking of the rotation of the ring gear 14.

Next, a clutch 20 is described with reference to FIGS. 4 and 5.

The clutch 20 is supported by a casing (not diagramed) so that the clutch can turn. The clutch 20 includes a pawl 29 that has a locking click 28 on its tip; a clutch spring 30 that operates this pawl 29; and the ratchet tooth 19 of the ring gear 14 that can engage with the locking click 28 of the pawl 29. When the pawl 29 is operated in the direction of the ratchet tooth 19, the locking click 28 hits a plane that is approximately orthogonal to a sloped surface of the ratchet tooth 19. In this way, the locking click 28 locks a rotation of the ring gear 14 in one direction.

Further, a base of the clutch spring 30 is curved, forming an arc. The curved part 31 is locked so that the curved part 31 is wrapped to the outer circumference of an axis of the first connect gear 23. Further, a tip of the clutch spring 30 is elongated in the direction of the pawl 29, and engages with an access window 32 of the pawl 29. The curved part 31 of the clutch spring 30 engages with an axis of the first connect gear 23 due to friction. When a torque greater than or equal to a predetermined value operates between the first connect gear 23 and the curved part 31, the torque causes a slipping between the first connect gear 23 and the curved part 31.

Therefore, the clutch 20 is structured so that, when the motor 10 rotates in the direction of normal rotation (refer to the solid arrow shown in FIG. 4), the clutch spring 30 changes its position from that shown in a solid line in FIG. 5 to the position shown in a dotted line. As a result, the locking click 28 of the pawl 29 engages with the ratchet tooth 19 as shown in FIG. 4, and locks the rotation of the ring gear 18. Thus, the ratchet tooth 19 can reliably lock the rotation of the ring gear 18 in one direction. However, when the ring gear 18 tries to rotate in the opposite direction, a force greater than or equal to a certain magnitude is necessary for the ratchet tooth 19 to push up the locking click 28. Accordingly, the clutch spring 30 applies a resistance force greater than or equal to a certain magnitude to a rotation of the ring gear 18 in the opposite direction.

When a rotation of the ring gear 18 is locked as described above, the rotational force that was transmitted to the sun gear 14 is transmitted entirely to the belt reel 12, causing the rotation of the carrier 17 (referred to as a state of clutch engaging).

Meanwhile, when the motor 10 rotates in the opposite direction from the state of clutch engaging, the first connect gear 23 rotates as shown in a dotted arrow in FIG. 4. In addition, the clutch spring 30 moves as shown in a solid line in FIG. 5. Thus, the locking click 28 of the pawl 29 is detached from the ratchet tooth 19, and the ring gear 18 is unlocked.

When the ring gear 18 is unlocked as described above, the rotational force transmitted to the sun gear 14 makes the planetary gear 16 rotate on its own axis. At this time, the ring gear 18 idles away so that power will not be transmitted to the side of the carrier 17 (the belt reel 12) (referred to as state of clutch released).

Incidentally, as shown in FIG. 2, the input side of the controller 21 is connected to a rotation sensor 11, a longitudinal acceleration sensor 41 (acceleration detection unit) which detects an acceleration of the vehicle in the longitudinal direction, a lateral acceleration sensor 42 (acceleration detection unit) which detects an acceleration of the vehicle in the lateral direction, a yaw rate sensor 43 (acceleration detection unit) which detects the angular acceleration of the vehicle in the yaw direction, an electric current sensor 40 which detects the electric current running through the motor 10, and a vehicle velocity sensor 44 which detects the velocity with which the vehicle is running.

In addition, the controller 21 includes an acceleration condition determination unit 36 which determines the acceleration condition of the vehicle based on a detection signal by, for example, the longitudinal acceleration sensor 41, the lateral acceleration sensor 42, the yaw rate sensor 43. The controller 21 also includes an electric current control unit 35 which controls the driving electric current of the motor 10 based on the determination result by the acceleration condition determination unit 36.

The acceleration condition determination unit 36 determines whether or not an acceleration greater than or equal to a predetermined value G2 (for example, 0.3 G) has been applied to the vehicle during a predetermined amount of time t1 (for example, 2.0 seconds) after an acceleration greater than or equal to a first threshold value of the acceleration G1 (for example, 0.45 G) has been applied to the vehicle. The acceleration greater than or equal to the first threshold value G1 is such that the upper body of the passenger 3 seated on the seat 2 is highly likely to vacillate. In this case, the acceleration being applied to the vehicle is determined, for example, by the detection result of the longitudinal acceleration sensor 41, the lateral acceleration sensor 42, and the yaw rate sensor 43. In addition, although it is preferable that the predetermined value G2 is set to a value smaller than the first threshold value of the acceleration G1, the value of G2 may also be equal to the value of G1.

In addition, when the vehicle is running under normal conditions, the electric current control unit 35 performs a control as described below in (a) through (c) based on the detection signal from the sensors 41, 42, and 43.

(a) When the acceleration G being applied to the vehicle is less than the second threshold value of the acceleration G2 (G2<G1), stop the electric current being applied to the motor 10.

(b) When the acceleration G being applied to the vehicle is greater than or equal to the second threshold value of the acceleration G2 and is less than the first threshold value of the acceleration G1, the webbing reel 12 is not driven to wrap up the webbing. Instead, the motor 10 is supplied with a driving electric current Iw (the minimum amount of electric current in which the connected state can be maintained) such that the clutch 20 can be kept in a connected state.

(c) When an acceleration greater than or equal to a predetermined value G2 is applied to the vehicle within a predetermined amount of time t1 after the acceleration G applied to the vehicle becomes greater than or equal to a first threshold value of the acceleration G1, a predetermined amount (for instance, 10 mm) of the webbing 5 is wrapped up. Thereafter, the driving electric current of the motor 10 is controlled based on the movement of the upper body of the passenger 3 (the pulling out of the webbing 5).

(d) When an acceleration greater than or equal to the predetermined value G2 has not been applied to the vehicle within the predetermined amount of time t1 after the acceleration G being applied to the vehicle became greater than or equal to the first threshold of the acceleration G1, the driving electric current of the motor 10 is controlled based on the movement of the upper body (such as the pulling out of the webbing 5) of the passenger 3.

Incidentally, the electric current controlling unit 35 of the controller 21 performs an electric current control which is different from what was described above during an emergency or when the webbing 5 is being stored. However, explanations regarding such controls are omitted.

Hereinafter, an example of the control operation of the seatbelt device 1 performed by the controller 21 is described with reference to the flow chart in FIGS. 6-8.

Figure 6:
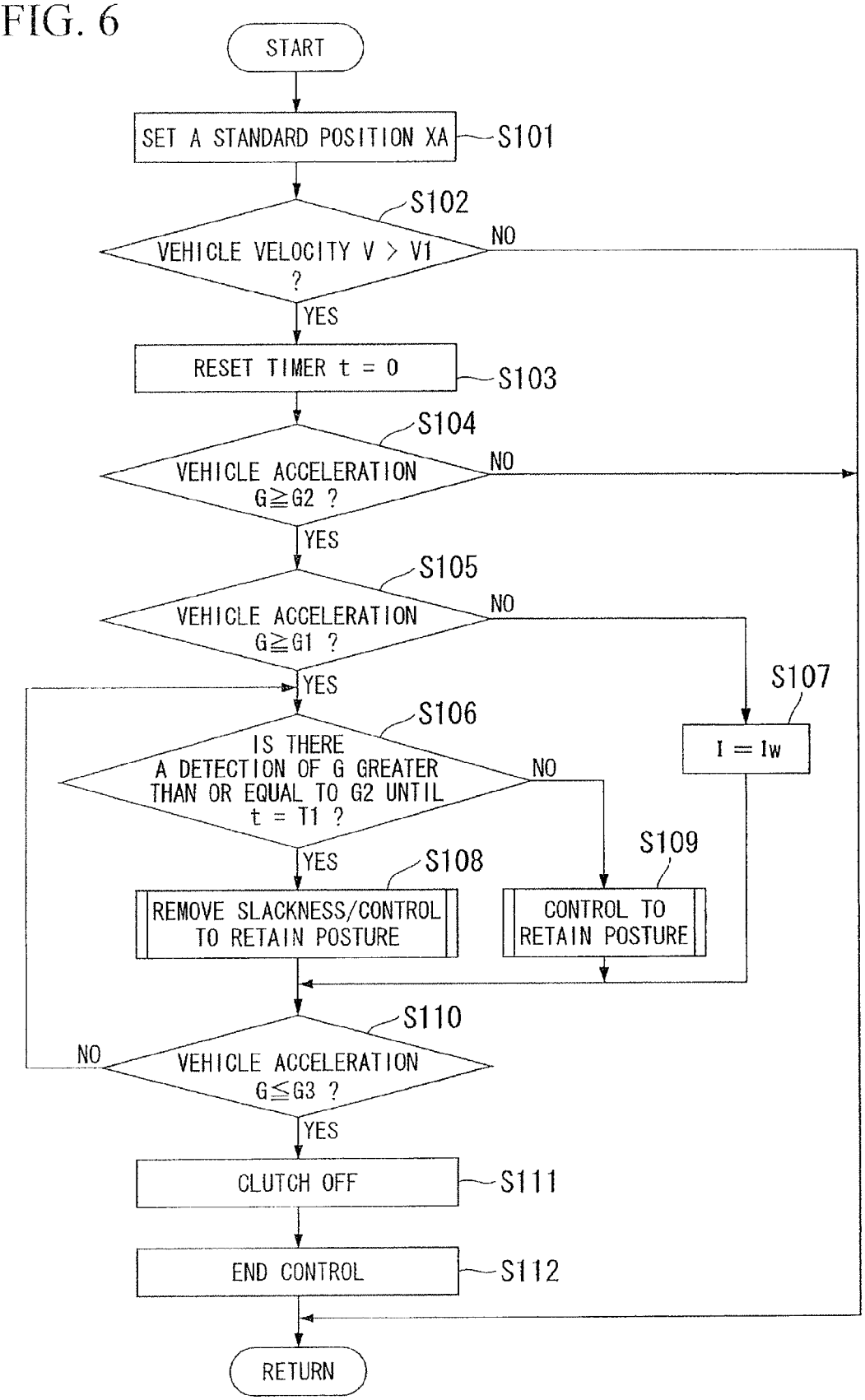
FIG. 6 is a flowchart showing a process of a control of a seatbelt device according to an embodiment of the present invention.

FIG. 6 is a flowchart indicating a main flow of the control.

In step S101, a wrapping up position of the webbing reel 12 while the vehicle is running is measured. Further, in step S101, a standard position XA of the wrapping up operation is established using the average values and the like of the measurements.

In step S102, it is determined whether or not the current velocity of the vehicle exceeds a prescribed value V1 of the vehicle velocity (for instance, 40 km/h). If the result is YES, the routine proceeds to step S103. If the result is NO, the routine returns.

In step S103, the time value, which will be used later, is reset. In the subsequent step S104, it is determined whether or not the current acceleration G of the vehicle is greater than or equal to a second threshold value G2 of the acceleration. Here, if the result is YES, the routine proceeds to step S105. When the result is NO, the routine returns.

In step S105, it is determined whether or not the current acceleration G of the vehicle is greater than or equal to a first threshold value G1 of the acceleration. Here, if the result is YES, the routine proceeds to step S106. When the result is NO, the routine proceeds to step S107.

In step S107, an electric current Iw is supplied to the motor 10. The electric current Iw is the minimum amount of electric current necessary to maintain the clutch 20 in a connecting condition.

Further, in step S106, it is determined whether or not an acceleration greater than or equal to the set value G2 has been applied to the vehicle within a predetermined period of time t1 (until the timer value becomes t1) after the current acceleration G of the vehicle became greater than or equal to the first threshold value G1 of the acceleration. If the result is YES, the routine proceeds to step S108 in which a slackness is removed and a control is performed to maintain the posture. If the result is NO, the routine proceeds to step S109 in which the control is performed to maintain the posture. The operations performed in step S108 (the removing of the slackness and the control to maintain the posture) and step S109 (the control to maintain the posture) are described later.

After each control in steps S108 and S109 is completed, the routine proceeds to step S110. In step S110, it is determined whether or not the current acceleration G of the vehicle is less than or equal to a third threshold value G3 of the acceleration (for instance, 0.25G). The third threshold value G3 is smaller than the second threshold value G2. If the result is YES, the routine proceeds to step S111. If the result is NO, the routine returns to step S106. In other words, until the velocity G of the vehicle becomes less than or equal to the third threshold value G3 of the acceleration and the vehicle reaches a stable condition, the operation performed in step S108 (the removing of the slackness and the control to maintain the posture) or step S109 (the control to maintain the posture) is carried out.

In step S111, the motor 10 is run reversely for an imperceptible amount of time, turning the clutch 20 off. In this way, the motor 10 is disconnected from the webbing reel 12. Then, the routine returns after the control is halted at step S112.

In FIG. 6, steps S104 through steps S105 may also be configured so that the seatbelt device 1 according to the present invention further includes a timer 90 measuring a time; and a control device 91 initiating a measurement of the time with the timer 90. The control device 91 initiates the measurement of time when, after the acceleration detected by the acceleration detection unit 41 becomes greater than or equal to a second threshold acceleration value, the acceleration becomes greater than or equal to the first threshold acceleration value. Here, the second threshold acceleration value is smaller than the first threshold acceleration value. Furthermore, the electric current control unit 35 controls the driving current of the motor 10 so that the webbing 5 is wrapped up by a predetermined length, when the acceleration condition determination unit 36 determines that the acceleration detected by the acceleration detection unit 41 is greater than or equal to the second threshold acceleration value, while the time measured with the timer 90 is within a predetermined period of time.

Figure 7:
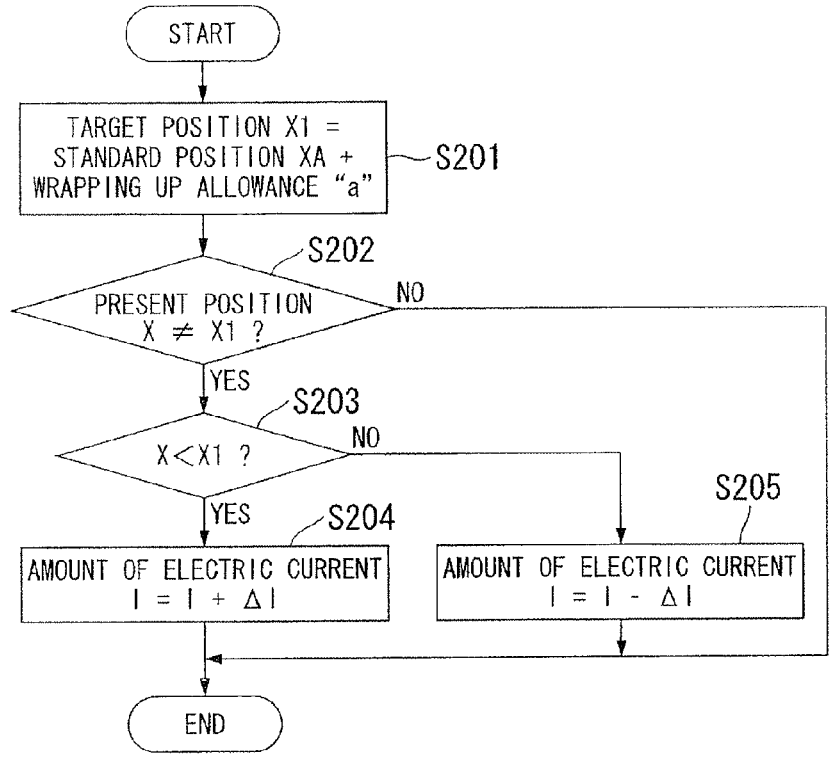
FIG. 7 is a flowchart showing a process of a control of a seatbelt device according to an embodiment of the present invention.

FIG. 7 is a flowchart showing the operation performed in step S108 (the removing of the slackness and the control to maintain the posture) in FIG. 6. FIG. 8 is a flowchart showing the operation performed in step S109 (the control to maintain the posture).

In the operation shown in FIG. 7 (the removing of the slackness and the control to maintain the posture), a target position X1 of the webbing reel 12 (a target rotational position) is set in step S201. The target position X1 set here is the value obtained by adding a set value "a" (i.e., a wrapping up allowance "a" such as 10 mm) to a standard position XA.

Next, in step S202, it is determined whether or not the current position X of the webbing reel is not equal to the target position X1. If the result is YES (i.e., the current position X is not equal to the target position X1), the routine proceeds to S203. If the result is NO (i.e., the current position X is equal to the target position X1), the routine is terminated.

In step S203, it is determined whether or not the current position X is smaller than the target position X1. Here, if the result is YES, the routine proceeds to step S204, and electric current is supplied to the motor 10 by performing a modification in which the target electric current amount I of the motor 10 is increased by an imperceptible amount ΔI. Meanwhile, if the result is NO, the routine proceeds to step S205, and electric current is supplied to the motor 10 by performing a modification in which the target electric current amount I of the motor 10 is decreased by an imperceptible amount ΔI.

Therefore, in this operation performed in step S108 (the removing of the slackness and the control to maintain the posture), a set amount of the webbing 5 is wrapped up so that the webbing 5 tightly contacts the passenger 3. In order to maintain this condition, the pulling-in operation of the webbing 5 is controlled by the motor according to the movement of the upper body of the passenger 3.

Figure 8:
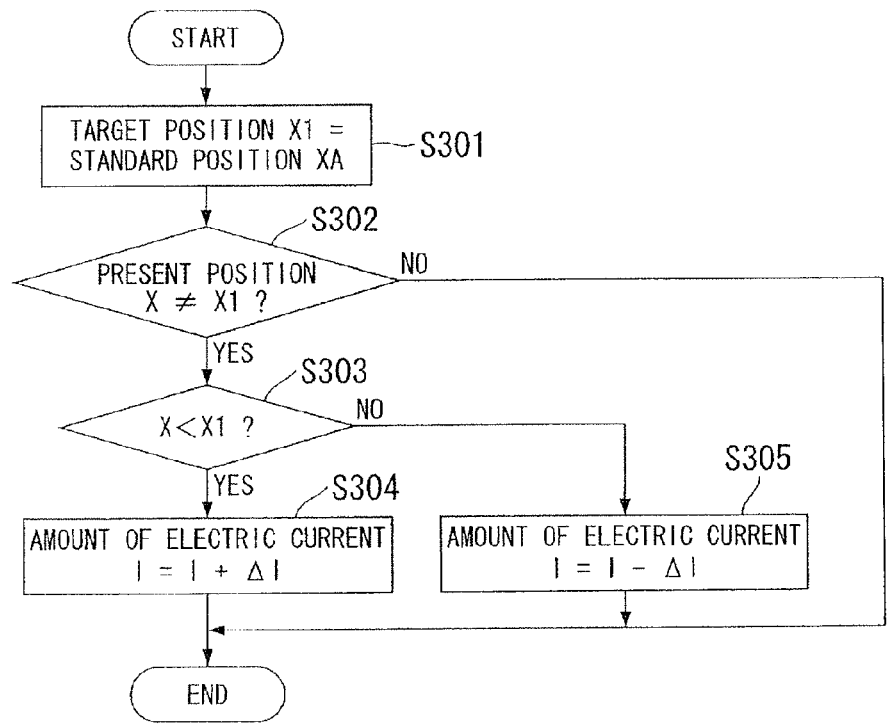
FIG. 8 is a flowchart showing a process of a control of a seatbelt device according to an embodiment of the present invention.

Next, the operation shown in the flowchart in FIG. 8 (the control to maintain the posture) is described. In the first step S301, the setting of the target position X1 of the webbing reel 12 is different from the setting in the operation shown in FIG. 7 (the removing of the slackness and the control to maintain the posture). The routine in and after step S302 shown in the flowchart in FIG. 8 is the same as the routine in and after step S202 of the operation performed in the flowchart in FIG. 7 (the removing of the slackness and the control to maintain the posture).

Said differently, in step S201 of the operation performed in the flowchart in FIG. 7 (the removing of the slackness and the control to maintain the posture) a target position X1 of the webbing reel 12 is set to be the value obtained by adding a set value "a" (i.e., a wrapping up allowance "a" such as 10 mm) to a standard position XA. However, in step S301 of the operation shown in FIG. 8 (the control to maintain the posture), the standard position XA is set as the target position X1 of the webbing reel 12. The routine in and after step S302 is similar to the routine in and after step S202 of the operation performed in the flowchart in FIG. 7 (the removing of the slackness and the control to maintain the posture) and will not be described here.

In the control to maintain the posture, the pulling-in operation of the webbing 5 performed by the motor 10 is controlled according to the movement of the upper body of the passenger 3 so that the position of the webbing reel 12 is maintained at the standard position XA.

According to the seatbelt device 1 based on the present invention, a set amount of the webbing 5 is wrapped up in the operation performed in the flowchart in FIG. 7 (the removing of the slackness and the control to maintain the posture), when it is determined that an acceleration greater than or equal to a set value (i.e., in the example described above, the second threshold value of the acceleration G2) is applied to the vehicle within a predetermined amount of time t1, after an acceleration G greater than or equal to the first threshold value G1, which creates a high probability of the upper body of the passenger 3 to oscillate, is detected. In a condition in which the upper body of the passenger 3 oscillates for a rather continuous amount of time, for example when the vehicle is negotiating a tight curve with a high speed, the passenger can be tied down reliably at an early stage with the webbing. Thus, the passenger 3 can be tied down in a stable condition to the seat 2.

Further, in the operation performed in the flowchart in FIG. 7 (the removing of the slackness and the control to maintain the posture), the motor 10 is driven to pull in according to the movement of the upper body of the passenger 3 after a set amount of the webbing 5 is wrapped up. Therefore, as long as the webbing 5 is pulled out by the contacting of the upper body of the passenger 3, there will be no unnecessary binding force applying to the passenger 3. In this way, it is possible to provide a level of comfort to the passenger 3 in addition to securing the passenger with a high degree of reliability.

In addition, according to the seatbelt device 1 based on the present invention, when it is determined that an acceleration G greater than or equal to a set value has not been applied to the vehicle within a predetermined amount of time t1 after the acceleration G greater than or equal to the first threshold value G1 of the acceleration is detected, a set amount of the webbing 5 is not wrapped up. Instead, the control to maintain the posture is executed. Thus, in a condition in which the upper body of the passenger 3 does not oscillate for a rather continuous amount of time, it is possible to prevent any unnecessary restraining of the passenger with the webbing 5. Consequently, the level of comfort of the passenger 3 can be enhanced.

Furthermore, according to the control to maintain the posture, a set amount of the webbing 5 is not wrapped up. Instead, the motor 10 is driven to pull in according to the movement of the upper body of the passenger 3. Therefore, it is possible to prevent any unnecessary oppression being applied to the passenger 3 due to the webbing 5 while the upper body of the passenger 3 is not oscillated. At the same time, when the upper body of the passenger is oscillated, it is possible to secure the passenger 3 reliably with the webbing 5.

According to the seatbelt device 1 based on the present invention, in a condition in which the upper body of the passenger 3 oscillates for a rather continuous amount of time, as described above, the motor 10 is controlled according to the movement of the upper body of the passenger 3 after a set amount of the webbing 5 is wrapped up. Therefore, the passenger can be secured promptly in response to even a small amount of oscillation of the upper body of the passenger 3. Meanwhile, in a condition in which the oscillation of the upper body of the passenger 3 is not continuous, the webbing 5 is not wrapped up. Instead, the motor 10 is controlled according to the movement of the upper body of the passenger 3. Therefore, the passenger 3 can be secured with the webbing 5 only when the upper body of the passenger 3 oscillates by a relatively large degree. In other words, according to the seatbelt device 1 based on the present invention, the operation sensitivity of securing the passenger with the webbing 5 is switched (altered) according to the condition of the vehicle, i.e., the condition in which the acceleration is maintained. Thus, it is possible to provide a high level of comfort to the passenger 3 in addition to securing the passenger 3 with a high degree of reliability.

Further, according to the seatbelt device 1 based on the present invention, when the acceleration G applying to the vehicle is greater than or equal to the second threshold G2 of the acceleration and is less than the first threshold G1 of the acceleration, an electric current Iw is supplied to the motor 10. The electric current Iw is roughly the minimum amount of electric current necessary to maintain the clutch 20 in a connected state. In this way, the motor 10 operates as a load resisting the pulling out of the webbing 5. As a result, it is possible to further reduce the degree of suppression being experienced by the passenger 3 due to the webbing 5. At the same time, it is possible to prepare for the execution of the control of promptly wrapping up the webbing 5, i.e., the operation shown in FIG. 7 (the removing of the slackness and the control to maintain the posture) and the operation shown in FIG. 8 (the control to maintain the posture).

While a preferred embodiment of the present invention has been described above, it should be understood that these are exemplary of the invention and are not to be considered as limiting the present invention. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A seatbelt device of a vehicle comprising:
a webbing reel around which a webbing is rolled up;
a motor which is driven to rotate the webbing reel;
an acceleration detection unit detecting an acceleration applying to the vehicle;
an electric current control unit controlling a driving current of the motor; and
an acceleration condition determination unit determining, based on a detection signal of the acceleration detection unit, whether or not an acceleration greater than or equal to a set value has been applied to the vehicle within a predetermined amount of time after an acceleration greater than or equal to a first threshold acceleration value has been applied to the vehicle, wherein
when the acceleration condition determination unit determines that an acceleration greater than or equal to the set value has been applied to the vehicle within the predetermined amount of time, the electric current control unit controls the driving current of the motor so that a set amount of the webbing is wrapped up,
when the acceleration condition determination unit determines that an acceleration greater than or equal to the set value has not been applied to the vehicle within the predetermined amount of time, the electric current control unit controls the driving current of the motor according to a movement of an upper body of a passenger, and
the set value is less than the first threshold acceleration value.

2. A seatbelt device of a vehicle according to claim 1, wherein
after the electric current control unit controls the driving current of the motor so that the set amount of the webbing is wrapped up when the acceleration condition determination unit determines that an acceleration greater than or equal to the set value has been applied to the vehicle within the predetermined amount of time, the electric current control unit controls the driving current of the motor according to a movement of an upper body of a passenger.

3. A seatbelt device of a vehicle according to claim 1, further comprising:
a clutch maintaining the motor and the webbing reel in a connected state in response to a rotational torque greater than or equal to a set torque value in a direction in which the webbing is wrapped up by the motor, wherein
when an acceleration being applied to the vehicle is greater than or equal to a second threshold acceleration value, the second threshold acceleration value being smaller than the first threshold acceleration value, and is less than the first threshold acceleration value, the electric current control unit controls the driving current of the motor so that the clutch is maintained in the connected state, without the motor being driven to wrap up the webbing reel.

4. A seatbelt device of a vehicle according to claim 1, further comprising:
a timer measuring a time; and
a control device initiating a measurement of the time with the timer when, after the acceleration detected by the acceleration detection unit becomes greater than or equal to a second threshold acceleration value, the acceleration becomes greater than or equal to the first threshold acceleration value, the second threshold acceleration value being smaller than the first threshold acceleration value, wherein
the electric current control unit controls the driving current of the motor so that the webbing is wrapped up by a predetermined length, when the acceleration condition determination unit determines that the acceleration detected by the acceleration detection unit is greater than or equal to the second threshold acceleration value, while the time measured with the timer is within a predetermined period of time.

* * * * *